Oct. 15, 1968  J. S. MIXSON  3,405,887
RING WING TENSION VEHICLE
Filed Oct. 10, 1966

INVENTOR
JOHN S. MIXSON

BY

ATTORNEYS

United States Patent Office 3,405,887
Patented Oct. 15, 1968

3,405,887
RING WING TENSION VEHICLE
John S. Mixson, Hampton, Va., assignor to the United
States of America as represented by the Administrator
of the National Aeronautics and Space Administration
Filed Oct. 10, 1966, Ser. No. 586,325
6 Claims. (Cl. 244—1)

ABSTRACT OF THE DISCLOSURE

A ring wing entry vehicle designed so that all the major structural components are stressed in tension upon entry into a low density atmosphere by providing a main shell shaped to produce tension stresses in response to gas flow drag, and a ring wing secured to the shell and shaped to produce lift forces directed so as to counteract and absorb the compressive reaction forces.

---

The invention described herein was made by an employee of the United States Government and may be manufactured and used by or for the Government for governmental purposes without the payment of any royalties thereon or therefor.

This invention relates generally to aerospace vehicles and more particularly to a ring wing vehicle having a high drag-to-weight ratio and especially adapted for entry into low density atmospheres.

It has been known for many years that annular or ring wings could be utilized for various types of aircraft. These ring wing constructions are attached to a vehicle to permit flight because of the high power available. That is, the ring wings provide the necessary lift for substantially horizontal flight under high power conditions. It has also been proposed to utilize a ring airfoil for providing control and lift for landing various objects. For example, see United States Patent 3,154,269 issued to Musil on Oct. 27, 1964. Each of these known ring wing constructions is required to operate in high-density atmospheres wherein substantial aerodynamic forces may be created in order to provide the necessary control and lift. Furthermore, these known ring wings require substantial structural strength and, consequently, substantial weight in order to accomplish their intended purposes. The requirement for heavy materials in construction of the known annular wings is the result of having to design for buckling under the applied loads. Any such constructions which are not made of heavy materials are of such light construction that they are incapable of withstanding the forces applied to them during entry from space into an atmosphere, whether of low or high density.

In order to overcome the disadvantages of the prior art, the instant invention contemplates the use of a ring wing connected by struts to a tension shell to which the payload being delivered is attached.

Accordingly, it is an object of this invention to provide a low-density atmosphere entry vehicle of light weight and sturdy construction.

Another object of the instant invention is to provide an entry vehicle having a high ratio of drag-to-weight.

Still another object of this invention is to provide an atmosphere entry vehicle having a tension shell and connected ring wing to efficiently utilize material strength in effecting in a high drag-to-weight ratio.

A further object of the instant invention is to provide a ring wing of airfoil cross section connected by struts to an infundibular tension shell which has a payload attached at the apex thereof.

Generally, the foregoing and other objects are accomplished by utilizing a ring wing of airfoil cross section which is connected to peripherally spaced struts that extend from an infundibular tension shell. The configuration of the tension shell and the spacing of the struts permits airflow through the spaces between struts and, by proper arrangement of the ring wing airfoil, the air flow is directed over the ring wing which accomplishes the high drag-to-weight ratio. Because of the overall configuration of the instant vehicle, the ring wing, tension shell and struts need to be designed only for tension forces which permit the most economical use of the materials from which the vehicle is constructed.

A more complete appreciation of the invention and many of the attendant advantages thereof will be readily apparent as the same becomes better understood by reference to the following description when considered in connection with the accompanying drawings wherein.

Figure 1:
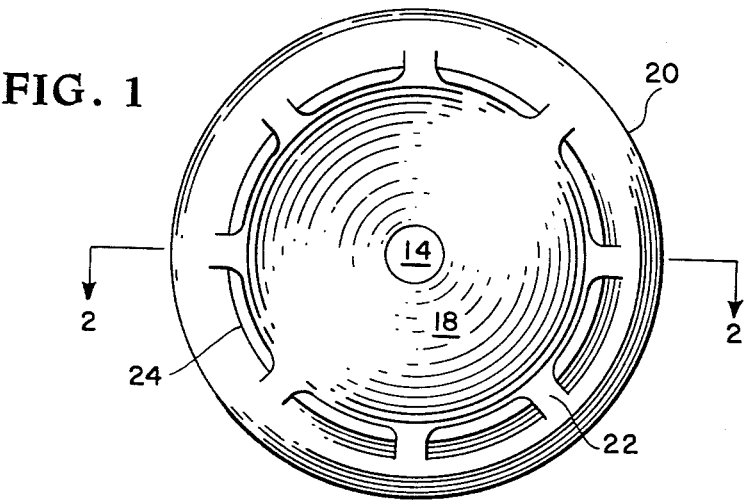
FIG. 1 is a plan view of the instant vehicle looking from the payload toward the wing.
Figure 2:
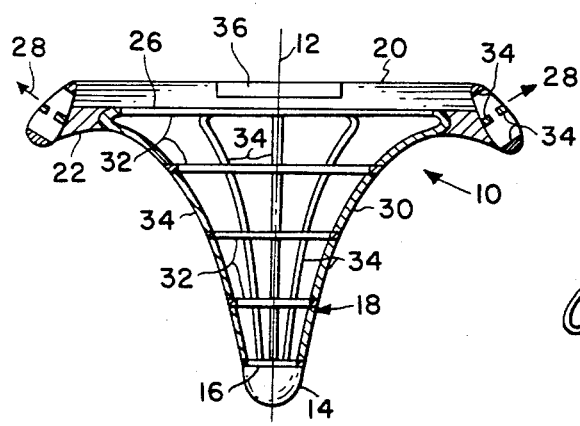
FIG. 2 is a cross section taken on line 2—2 of FIG. 1 showing one embodiment of the invention with parts omitted for clarity.
Figure 3:
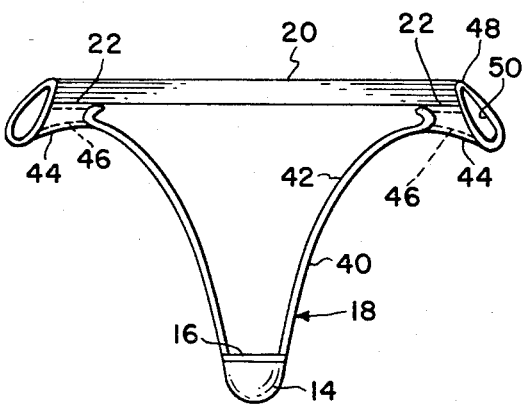
FIG. 3 is a sectional view similar to FIG. 2 but showing another embodiment of the invention.
Figure 4:
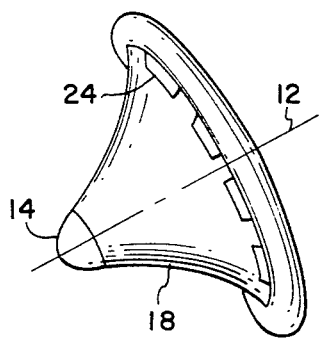
FIG. 4 is a simplified perspective view of the instant invention.

Referring now to the drawings wherein like reference numerals designate similar parts and more particularly to FIGS. 1–3 wherein vehicle 10 is shown to have centerline 12. It is to be noted from FIG. 1 that vehicle 10 is symmetrical about centerline 12 and, accordingly, any line on a surface can be considered to provide a surface of revolution about centerline 12. Payload 14 is attached to compression ring 16 on the apex or narrowest section of tension shell 18. As is apparent from the drawings, shell 18 is infundibular and expands to a base 26 of substantially greater area than the area within compression ring 16. As is evident from FIG. 2, ring wing 20 has a median cross section of airfoil configuration for a purpose to be described more fully hereinafter.

Struts 22 connect tension shell 18 and ring wing 20 and are areodynamically designed to provide a smooth flow of air while establishing high drag. It is to be further noted from FIG. 2 that ring wing 20 is so located that as an airfoil it is designed for maximum lift and drag. The lift and drag provided by airfoil 20 is accomplished by the airflow through the air passages 24 between struts 22.

Vehicle 10 as shown is aerodynamically stable, but under certain conditions, for example, landing at a predetermined site, it may be desirable to provide some type of control. Under such circumstances, it is merely necessary to provide trailing edge flaps 36, FIG. 2, on ring wing 20. Conventional apparatus, not shown, for controlling flaps 36 could be located as desired; provided, the stability of vehicle 10 is not disturbed.

Ring wing 20 is attached to tension shell 18 at the rear or base 26 of entry vehicle 10 by a plurality of tension struts 22. Open spaces 24 are provided so that airflow can pass between tension shell 18 and the inner surface of ring wing 20. The meridian cross section of ring wing 20 is aerodynamically designed as an effective airfoil, see FIG. 2, so that the airflow over it produces a lift force directed radially away from centerline 12 of vehicle 10 and also an aerodynamic drag force. The lift force, directed as shown by arrows 28, is transmitted, by proper structural design of struts 22 and wing 20, into tension struts 22 and then into tension shell 18. Proper design of tension shell 18 provides for circumferential transmission of the tensile forces from struts 22 into the areas between the struts. As is evident from the drawings, vehicle 10 is constructed to provide maximum lift and drag and to provide a space within tension shell 18 wherein, if necessary, a package could be located.

It is readily apparent that tension shell 18, struts 22 and ring wing 20 may be constructed from almost any material desired. For example, a construction as shown in FIG. 2 wherein skin 30 is attached to circular frames 32 and stringers 34 or a preformed construction from aluminum or stainless steel is contemplated. It is also apparent that the vehicle, see FIG. 3, could be constructed in a hollow configuration or from multiple plies 40–42, 44–46 and 48–50 of air impervious materials, such for example as Mylar, and be inflatable. The latter construction would permit packaging of the vehicle during launch from the earth and a subsequent inflation in space for reentry into atmospheres of low density. The prime consideration in the instant vehicle is the required circumferential tension or stiffness around the wing. As long as the infundibular configuration of tension shell 18 is maintained with proper air spaces 24 between struts 22 to provide airflow against ring wing 20, there should be no difficulty in providing such circumferential stiffness.

Thus, it is seen that a major advantage of the instant ring wing, tension shell vehicle is the use of aerodynamic forces to produce tensile stresses in most parts of the structure to thereby permit greater use of the allowable strength of the material from which vehicle 10 is constructed. Such a design of the ring wing results in a lighter structure than would be accomplished if it were necessary to design for buckling stresses in the area of wing 20 or base 26. Another advantage is provided by the drag force produced by the ring wing 20. This drag force allows the entry vehicle to be designed with a smaller overall diameter compared with other types of similar vehicles.

The instant invention provides the combination of a ring wing producing uniform, radially outward aerodynamic forces with tension struts transmitting the tension force into the tension shell. In the present application, the vehicle enters the planetary atmosphere and descends payload first with the tension shell and ring wing 20 acting as deceleration devices, and with ring wing 20 acting as a more efficient, in terms of lower weight, structural component than the compression ring normally expected in a structure similar to that herein disclosed. Furthermore, the configuration is designed to be aerodynamically stable as well as controllable by conventional trailing edge flaps 36, see FIG. 2.

Obviously, many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. A ring wing tension vehicle comprising:
   an infundibularly shaped tension shell;
   a ring wing located and spaced entirely outwardly of surrounding the large end of said shell and having an air foil cross-section developing lift forces with a component directed radially outward in response to fluid flow along the length of said shell;
   a plurality of spaced strut members secured to said shell and said circular airfoil, whereby an aerodynamically stable vehicle having a high drag-to-weight ratio is provided.

2. The vehicle of claim 1 wherein said ring wing is flared, whereby additional drag forces are introduced to further lower the weight-to-drag ratio.

3. The vehicle of claim 1 wherein said ring wing and tension shell are comprised of a plurality of spaced, air-impervious surfaces to permit inflation thereof.

4. The vehicle of claim 1 wherein the apex of said tension shell comprises a compression ring for attachment of said payload.

5. The vehicle of claim 4 wherein said ring wing, struts and tension shell are formed of a skin and stringer construction.

6. The vehicle of claim 4 wherein said ring wing has trailing edge flaps for control of the vehicle during flight.

References Cited
UNITED STATES PATENTS

| | | | |
|---|---|---|---|
| 1,640,110 | 8/1927 | Bunevac | 244—142 |
| 1,780,104 | 10/1930 | Adams | 244—142 |
| 2,927,746 | 3/1960 | Mellen. | |
| 3,154,269 | 10/1964 | Musil. | |

FERGUS S. MIDDLETON, *Primary Examiner.*